US010995006B2

(12) United States Patent
Inoue et al.

(10) Patent No.: US 10,995,006 B2
(45) Date of Patent: May 4, 2021

(54) METHOD FOR PRODUCING POLYCRYSTALLINE SILICON

(71) Applicant: TOKUYAMA CORPORATION, Yamaguchi (JP)

(72) Inventors: Yuichi Inoue, Yamaguchi (JP); Masami Enokuchi, Yamaguchi (JP); Kotaro Okamura, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 84 days.

(21) Appl. No.: 16/340,348

(22) PCT Filed: Oct. 5, 2017

(86) PCT No.: PCT/JP2017/036340
§ 371 (c)(1),
(2) Date: Apr. 8, 2019

(87) PCT Pub. No.: WO2018/070341
PCT Pub. Date: Apr. 19, 2018

(65) Prior Publication Data
US 2019/0248658 A1 Aug. 15, 2019

(30) Foreign Application Priority Data
Oct. 12, 2016 (JP) .............................. JP2016-201229

(51) Int. Cl.
*C01B 33/035* (2006.01)
*C01B 3/56* (2006.01)
(Continued)

(52) U.S. Cl.
CPC ............ *C01B 33/035* (2013.01); *B01D 53/04* (2013.01); *C01B 3/52* (2013.01); *C01B 3/56* (2013.01);
(Continued)

(58) Field of Classification Search
CPC ......... C01B 33/02; C01B 33/035; C01B 3/52; C01B 3/56; B01D 2253/102; B01D 2256/16; B01D 2259/40086; B01D 53/04
See application file for complete search history.

(56) References Cited

U.S. PATENT DOCUMENTS

2012/0107219 A1\* 5/2012 Kamei ................ B01D 53/685
423/348
2012/0137881 A1 6/2012 Akiyoshi et al.
(Continued)

FOREIGN PATENT DOCUMENTS

CN 101357287 2/2009
CN 101791487 8/2010
(Continued)

OTHER PUBLICATIONS

EESR, EP Patent Application No. 17860490.6, mailed May 14, 2020, 8 pages.
(Continued)

*Primary Examiner* — Ngoc-Yen Nguyen
(74) *Attorney, Agent, or Firm* — Casimir Jones S.C.; J. Mitchell Jones (57) ABSTRACT

Provided is a method for producing polycrystalline silicon at a lighter environmental load and at low production cost. A method in accordance with the present invention for producing polycrystalline silicon includes: a silicon deposition step; a separation step; a hydrogen chloride removal step; a hydrogen refining step; an activated carbon regeneration step; and a circulation step.

5 Claims, 1 Drawing Sheet (51) Int. Cl.
    *B01D 53/04*     (2006.01)
    *C01B 33/02*     (2006.01)
    *C01B 3/52*     (2006.01)

(52) U.S. Cl.
    CPC ........ *C01B 33/02* (2013.01); *B01D 2253/102* (2013.01); *B01D 2256/16* (2013.01); *B01D 2259/40086* (2013.01)

(56) References Cited

U.S. PATENT DOCUMENTS

| | | |
|---|---|---|
| 2012/0177559 A1 | 7/2012 | Prine et al. |
| 2012/0198998 A1 | 8/2012 | Kurosawa |
| 2013/0011558 A1 | 1/2013 | Haeckl et al. |
| 2017/0007962 A1* | 1/2017 | Kim .................. B01D 53/8659 |

FOREIGN PATENT DOCUMENTS

| | | |
|---|---|---|
| EP | 2489630 | 8/2012 |
| JP | 2011-84422 | 4/2011 |
| JP | 2013-14504 | 1/2013 |
| KR | 101452354 B1 * | 10/2014 |
| WO | 2011/040214 | 4/2011 |

OTHER PUBLICATIONS

International Search Report for PCT/JP2017/036340, dated Dec. 19, 2017, 2 pages.
English Translation of International Preliminary Report on Patentability (Chapter II) for PCT/JP2017/036340, dated Apr. 18, 2019, 5 pages.

* cited by examiner

METHOD FOR PRODUCING POLYCRYSTALLINE SILICON

TECHNICAL FIELD

The present invention relates to a method for producing polycrystalline silicon.

BACKGROUND ART

Various methods for producing silicon which is used as a material of a semiconductor or a material of a wafer for solar power generation have been conventionally known. One of those methods is, for example, a Siemens method which is carried out as described below. According to the Siemens method, first, a mixed gas of hydrogen and trichlorosilane is supplied to a filament which has been made electrically conductive and heated. Subsequently, silicon is deposited on the filament by a chemical vapor deposition method so that polysilicon (also referred to as "polycrystalline silicon") is obtained.

Exhaust gas which is discharged through a step of obtaining polysilicon by the Siemens method contains hydrogen as a main component and also contains another impurity. Examples of the another impurity include unreacted trichlorosilane; a silane compound, hydrogen chloride, and the like each of which is a reaction by-product; and a small amount of boron which is contained, as an inevitable impurity, in metal silicon.

In a case where the exhaust gas which contains such an impurity is supplied, mainly as a hydrogen source, to the step of obtaining polysilicon, the exhaust gas thus supplied causes a deterioration in quality of resultant polycrystalline silicon. Thus, the exhaust gas is refined, and most of the refined exhaust gas is circulated to the step of obtaining polysilicon, but part of the refined exhaust gas is disposed of after being subjected to a proper treatment. As more polycrystalline silicon is produced, a larger amount of exhaust gas is disposed of accordingly. Against a background of this, a method for effectively reusing such exhaust gas is desired to be established.

Patent Literature 1 discloses a method for producing polysilicon, the method including: treating the exhaust gas with use of an adsorption tower which is filled with activated carbon; and reusing hydrogen chloride and a silane compound each of which has been adsorbed by the activated carbon.

CITATION LIST

Patent Literature

Patent Literature 1

Japanese Patent Application Publication, Tokukai, No. 2013-14504

SUMMARY OF INVENTION

Technical Problem

Note, however, that such a conventional technique as described earlier has more room for improvement in environmental load and in production cost.

The present invention has been made in view of the problems, and an object of the present invention is to provide a method for producing polycrystalline silicon at a lighter environmental load and at low production cost.

Solution to Problem

In order to attain the object, the inventors of the present invention repeatedly carried out diligent study. As a result, the inventors finally accomplished the present invention by finding that removal of hydrogen chloride with use of a chlorosilane solution achieves a method for producing polycrystalline silicon at a lighter environmental load and at lower production cost.

Specifically, a method in accordance with an embodiment of the present invention for producing polycrystalline silicon includes: a silicon deposition step of depositing the polycrystalline silicon by reacting a chlorosilane compound and hydrogen together; a separation step of separating, into a chlorosilane condensate and a gas component A, exhaust gas which is discharged through the silicon deposition step; a hydrogen chloride removal step of obtaining a gas component B by removing hydrogen chloride by bringing the gas component A into contact with a chlorosilane solution; a hydrogen refining step of obtaining hydrogen gas A by removing the chlorosilane compound by bringing the gas component B into contact with activated carbon; an activated carbon regeneration step of bringing the activated carbon, which has been brought into contact with the gas component B, into contact with hydrogen gas B so as to regenerate the activated carbon; and a circulation step of applying pressure to a gas component C which is obtained through the activated carbon regeneration step, and supplying the gas component C to the separation step.

Advantageous Effects of Invention

An embodiment of the present invention makes it possible to provide a method for producing polycrystalline silicon at a lighter environmental load and at low production cost.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Specifically, any embodiment based on a proper combination of technical means disclosed in different embodiments is also encompassed in the technical scope of the present invention. Note that all of the patent literatures listed herein are incorporated by reference herein. Note also that numerical expressions such as "A to B" herein mean "not less than A (equal to or more than A) and not more than B (equal to or less than B)" unless otherwise specified.

A method in accordance with an embodiment of the present invention for producing polycrystalline silicon (hereinafter referred to as "the present production method") includes: a silicon deposition step of depositing the polycrystalline silicon by reacting a chlorosilane compound and hydrogen together; a separation step of separating, into a chlorosilane condensate and a gas component A, exhaust gas which is discharged through the silicon deposition step; a hydrogen chloride removal step of obtaining a gas component B by removing hydrogen chloride by bringing the gas component A into contact with a chlorosilane solution; a hydrogen refining step of obtaining hydrogen gas A by removing the chlorosilane compound by bringing the gas component B into contact with activated carbon; an activated carbon regeneration step of bringing the activated carbon, which has been brought into contact with the gas component B, into contact with hydrogen gas B so as to regenerate the activated carbon; and a circulation step of applying pressure to a gas component C which is obtained through the activated carbon regeneration step, and supplying the gas component C to the separation step.

The present production method, which includes the above features, has such advantages as described below. Specifically, the present production method has, for example, (1) an advantage such that, since the hydrogen chloride is removed, in the hydrogen chloride removal step, by bringing the gas component A into contact with the chlorosilane solution, the present production method achieves a higher rate of removal of an impurity (which may contain dopant(s) such as boron (B) and/or phosphorus (P)) than a conventional technique in which hydrogen chloride is removed by being adsorbed by activated carbon, (2) an advantage such that the advantage (1) results in nonaccumulation of the impurity also in a case where the gas component C (which contains the hydrogen gas and the chlorosilane compound) is circulated to the separation step, (3) an advantage such that the present production method allows caustic soda to be used in a smaller amount to treat the hydrogen gas and the chlorosilane compound, (4) an advantage such that the advantages (1) through (3) allow the exhaust gas to be efficiently refined and efficiently circulated, and (5) an advantage such that the advantage (4) consequently makes it possible to provide a method for producing polycrystalline silicon at a lighter environmental load and at low production cost.

Further, according to Patent Literature 1, the exhaust gas is supplied to an STC (tetrachlorosilane) reduction step so as to be reused. In contrast, according to the present production method, the exhaust gas can be supplied to the separation step so as to be reused. The separation step is lower in operating pressure than the STC reduction step. Thus, as compared with the conventional technique, the present production method has an advantage of allowing equipment for applying pressure to gas so as to reuse the gas to be constructed on a smaller scale and at lower cost. Moreover, according to Patent Literature 1, the hydrogen chloride is removed from the exhaust gas with use of the activated carbon. In contrast, according to the present production method, the hydrogen chloride is removed by bringing the gas component A into contact with the chlorosilane solution. Thus, the present production method allows the hydrogen to be refined by using the activated carbon in a smaller volume.

Figure 1:
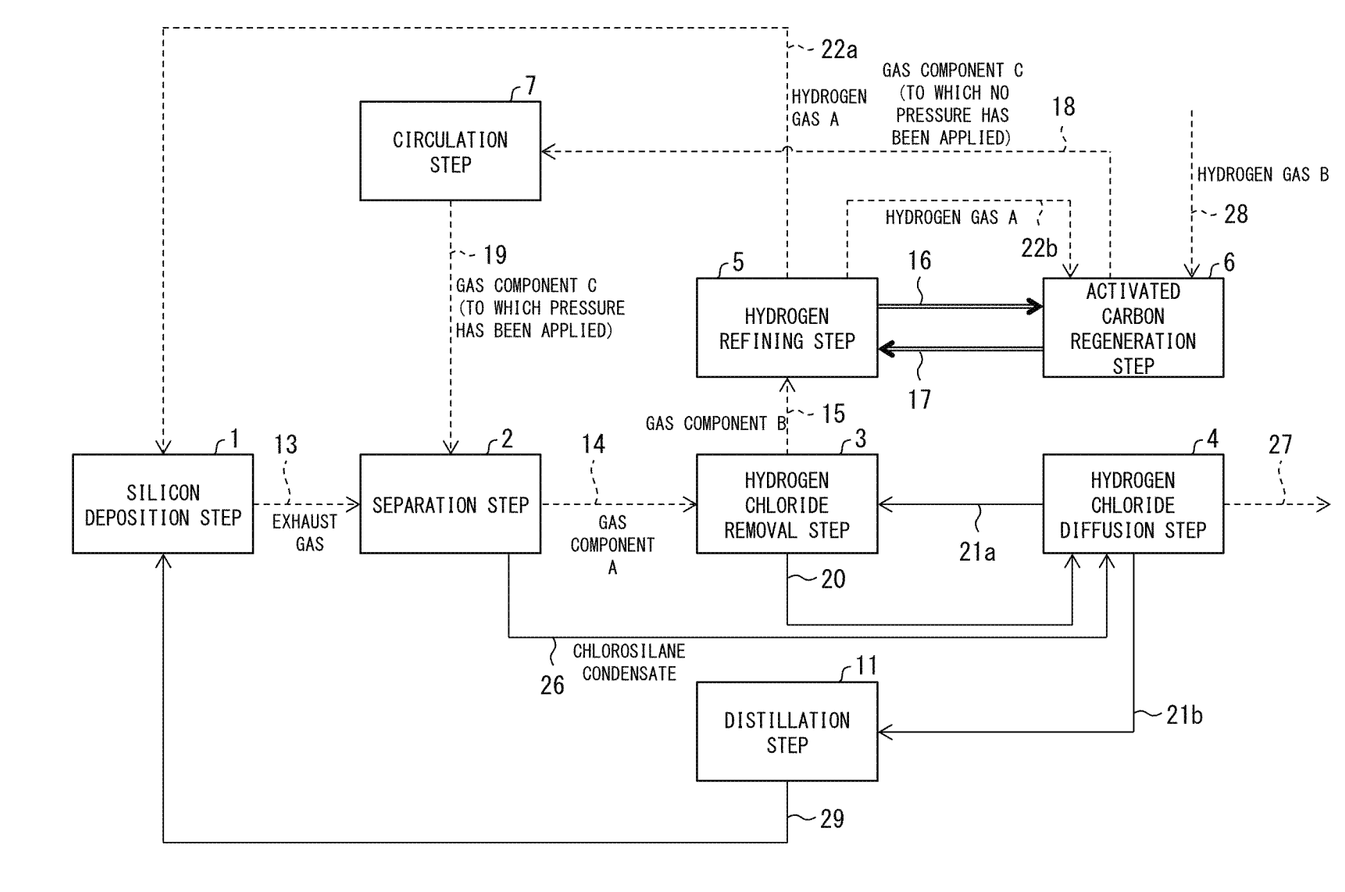
FIG. 1 is a view schematically illustrating a flow of gas components and a flow of a chlorosilane compound in a method in accordance with an embodiment of the present invention for producing polycrystalline silicon.

The following description specifically discusses, with reference to FIG. 1, the steps which are included in the present production method. Note that in FIG. 1, solid lines each indicate the chlorosilane compound which is in liquid form, broken lines indicate the gas components, and double lines indicate switching between adsorption towers each of which is filled with activated carbon.

<1. Silicon Deposition Step 1>

The present production method includes a silicon deposition step 1 of depositing polycrystalline silicon by reacting a chlorosilane compound and hydrogen together.

The silicon deposition step 1 is carried out with use of a reaction apparatus whose structure is not limited to any particular structure, and under a reaction condition which is not limited to any particular reaction condition. The silicon deposition step 1 can be carried out with use of a publicly known reaction apparatus and under a publicly known reaction condition. Specifically, the silicon deposition step 1 can be carried out by, for example, the Siemens method (a bell jar method) or a vapor to liquid deposition (VLD) method.

The Siemens method is a method which is carried out as described below. According to the Siemens method, first, a polycrystalline silicon core wire, which is a heating base material, is provided in a reactor (bell jar), and the polycrystalline silicon core wire is made electrically conductive and heated to a temperature which is not lower than a polycrystalline silicon deposition temperature. Subsequently, with the polycrystalline silicon core wire thus heated, material gas which contains a chlorosilane compound and hydrogen is brought into contact. The contact between the polycrystalline silicon wire and the material gas causes polycrystalline silicon to be deposited on a surface of the polycrystalline silicon core wire, so that a grown polycrystalline silicon rod is obtained.

According to the Siemens method, the polycrystalline silicon core wire which has been made electrically conductive and heated has a temperature which is not limited to any particular temperature, provided that the temperature is not lower than the polycrystalline silicon deposition temperature. Note, however, that the polycrystalline silicon core wire which has been made electrically conductive and heated has a temperature in a range of preferably 600° C. to 1250° C., and more preferably 900° C. to 1200° C. so that polycrystalline silicon is efficiently deposited.

The vapor to liquid deposition method includes a sequential method and a continuous method as below. According to the sequential method, first, a base material which is provided in a reactor is heated to a high temperature (e.g., not lower than 600° C.) which is not lower than the polycrystalline silicon deposition temperature. Subsequently, material gas which contains a chlorosilane compound and hydrogen is caused to flow to the base material so as to be in contact with the base material, so that polycrystalline silicon is deposited on a surface of the base material. Thereafter, the base material is maintained at a high temperature (e.g., 1450° C. to 1700° C.) which is not lower than a melting point of the polycrystalline silicon, so that the polycrystalline silicon thus deposited is melted and dropped so as to be collected. According to the continuous method, first, a base material which is provided in a reactor is heated to a high temperature (e.g., 1450° C. to 1700° C.) which is not lower than a melting point of polycrystalline silicon. Subsequently, material gas which contains a chlorosilane compound and hydrogen is caused to flow to the base material so as to be in contact with the base material. The contact between the base material and the material gas causes polycrystalline silicon to be deposited on a surface of the base material, and causes the polycrystalline silicon to be melted and dropped so as to be obtained.

The silicon deposition step 1 is preferably carried out by the vapor to liquid deposition method so that polycrystalline silicon is efficiently deposited.

Note that a chlorosilane compound herein means a compound which contains a chlorine element and a silicon element. In both the Siemens method and the vapor to liquid deposition method, the chlorosilane compound which is contained in the material gas can be, for example, trichlorosilane or dichlorosilane.

In the silicon deposition step 1, it is possible to use, as the chlorosilane compound which is contained in the material gas, a chlorosilane compound 29 which is obtained through a distillation step 11 (described later) and which has been made gaseous. In a case where the chlorosilane compound which is contained in the material gas is not enough, a chlorosilane compound which has been produced by a publicly known method can be supplied so as to be used to make up for a chlorosilane compound deficiency (not illustrated in FIG. 1). Trichlorosilane which is used as the chlorosilane compound can be commonly produced through a publicly known reaction between metal silicon and hydrogen chloride. In order to remove an impurity or impurities such as boron and/or phosphorus from trichlorosilane which has been obtained by distilling a product of the reaction, it is preferable to further distill the trichlorosilane. By further distilling the trichlorosilane, it is possible to obtain high purity trichlorosilane. In order to obtain high purity polycrystalline silicon, trichlorosilane which is used in the silicon deposition step 1 preferably has a purity of not less than 99.9%.

According to the silicon deposition step 1, the hydrogen which is contained in the material gas is supplied in an amount which is not limited to any particular amount, provided that the amount is in excess of an amount of the chlorosilane compound. Note, however, that the hydrogen is supplied in an amount of preferably not less than 3 mol with respect to 1 mol of the chlorosilane compound so that polycrystalline silicon is efficiently deposited.

According to the silicon deposition step 1, most of the hydrogen which is contained in the material gas can be supplied with hydrogen gas A 22a, and a hydrogen deficiency can be made up for by hydrogen (not illustrated in FIG. 1) which is obtained by a publicly known production method. For example, such hydrogen can be produced, with use of, for example, electrolytic equipment, by electrolyzing water. Specifically, it is possible to obtain hydrogen by electrolyzing water by causing an electric current to flow through an aqueous electrolyte solution which contains an inorganic acid metal salt and/or a metal hydroxide as an electrolyte(s) (i.e., an aqueous solution which contains an inorganic acid metal salt and/or a metal hydroxide as a solute(s)). In order to remove a metallic impurity from hydrogen which has been obtained through electrolysis, it is preferable to wash the hydrogen with water and further pass the hydrogen through a mist filter. By washing the hydrogen with water and further passing the hydrogen through a mist filter, it is possible to obtain hydrogen which substantially contains no metallic impurity. The hydrogen further preferably contains no gaseous impurities such as oxygen and water vapor. Oxygen and water vapor can be removed by a publicly known method which is known as a method for obtaining industrial hydrogen. In order to obtain high purity polycrystalline silicon, hydrogen which is used in the silicon deposition step 1 preferably has a purity of not less than 99.99 vol %.

Use of the above-described high purity trichlorosilane and the above-described high purity hydrogen makes it possible to obtain high purity polycrystalline silicon which has a purity of not less than 11 N.

<2. Separation Step 2>

The present production method includes a separation step 2 of separating, into a chlorosilane condensate 26 and a gas component A 14, exhaust gas 13 which is discharged through the silicon deposition step 1.

The exhaust gas 13 contains at least a chlorosilane compound, hydrogen, and hydrogen chloride. The chlorosilane compound which is contained in the exhaust gas 13 consists of (i) a pyrolysate of the chlorosilane compound which has been contained in the material gas and (ii) an unreacted part of the chlorosilane compound. The chlorosilane compound which is contained in the exhaust gas 13 contains at least one of tetrachlorosilane, trichlorosilane, dichlorosilane, monochlorosilane, hexachlorodisilane, pentachlorodisilane, and the like. The hydrogen which is contained in the exhaust gas 13 includes (i) hydrogen which is produced by pyrolyzing the chlorosilane compound which has been contained in the material gas and (ii) unreacted hydrogen. The hydrogen chloride which is contained in the exhaust gas 13 is hydrogen chloride which is secondarily produced from a polycrystalline silicon deposition reaction. The hydrogen chloride is contained in the exhaust gas 13 at a concentration of, for example, 0.1 mol % to 6 mol %, and, in particular, 0.2 mol % to 3 mol %.

The chlorosilane condensate 26 which is obtained in the separation step 2 is a mixture of various chlorosilane compounds which have been contained in the exhaust gas 13. The chlorosilane condensate 26, which further contains a little hydrogen chloride, is preferably supplied to a hydrogen chloride diffusion step 4. Note that the chlorosilane condensate 26 can be supplied to a step(s) such as a hydrogen chloride removal step 3 (described later) and/or the hydrogen chloride diffusion step 4 (described later), and can alternatively be used for a purpose which is different from the present production method.

The gas component A 14 which is obtained in the separation step 2 contains hydrogen gas and hydrogen chloride as main components. The gas component A 14 (i) further contains, in an amount of approximately several percent by volume, the chlorosilane compound which remains to be condensed and separated in a form of the chlorosilane condensate 26, and (ii) may contain, in trace amounts, metal silicon-derived boron and metal silicon-derived phosphorus.

In the separation step 2, the exhaust gas 13 is preferably cooled first. A cooling temperature to which to cool the exhaust gas 13 is not limited to any particular cooling temperature, provided that the cooling temperature is not higher than a temperature at which the chlorosilane compound is condensed. The cooling temperature can be appropriately determined in consideration of, for example, a cooling capacity of a cooling device to be used. A lower cooling temperature tends to be more effective in condensation of the chlorosilane compound. According to the separation step 2, the exhaust gas 13 is cooled to a cooling temperature of preferably not higher than $-10°$ C., and more preferably not higher than $-30°$ C. so that the exhaust gas 13 is more efficiently and more effectively separated into the chlorosilane condensate 26 and the gas component A 14. Meanwhile, the exhaust gas 13 is preferably cooled to a cooling temperature of higher than $-60°$ C. from the viewpoint of production cost.

In the separation step 2, a method by which to separate the exhaust gas 13 is not limited to any particular method, provided that the method allows the exhaust gas 13 to be separated into the chlorosilane condensate 26 and the gas component A 14. Note, however, that the exhaust gas 13 is preferably separated by a condensation removal method. The condensation removal method is a method for separating the exhaust gas 13 into the chlorosilane condensate 26 and the gas component A 14 by cooling the exhaust gas 13 so as to condense the chlorosilane compound.

In the separation step 2, a method by which to cool the exhaust gas 13 is not limited to any particular method, provided that the method allows the exhaust gas 13 to be cooled to the cooling temperature falling within the above range. Note, however, that the exhaust gas 13 can be cooled by a publicly known cooling method. Specific examples of such a cooling method include a cooling method of cooling the exhaust gas 13 by passing the exhaust gas 13 through a cooled heat exchanger, and a cooling method of cooling the exhaust gas 13 with use of a condensate which has been obtained by condensing and cooling the chlorosilane compound. These cooling methods can be used alone or in combination.

Next, the separation step 2 is preferably carried out in, for example, a pressure-resistant container and under a high pressure. A pressure under which to carry out the separation step 2 is not limited to any particular pressure, provided that the pressure allows the chlorosilane compound to be completely removed. The pressure can be appropriately determined in consideration of, for example, a capability of a condensation removal device to be used. In order to more effectively separate the exhaust gas 13 into the chlorosilane condensate 26 and the gas component A 14, the pressure is preferably not less than 400 kPaG, and more preferably not less than 500 kPaG.

According to the present production method, in order to increase pressure of the exhaust gas 13 which is to be supplied to the separation step 2, it is possible to provide a pressure application device in advance of carrying out the separation step 2. According to the present production method, in order to protect the pressure application device, it is preferable, upstream of the pressure application device, to carry out preliminary chlorosilane condensation or to provide a filter. Such a preferable arrangement can be employed as a method which is commonly carried out in industrial process design.

<3. Hydrogen Chloride Removal Step 3>

The present production method includes the hydrogen chloride removal step 3 of obtaining a gas component B 15 by removing hydrogen chloride by bringing the gas component A 14 into contact with a chlorosilane solution.

The chlorosilane solution which is used in the hydrogen chloride removal step 3 is a liquid which contains a chlorosilane compound. The chlorosilane compound is exemplified by, but not particularly limited to, trichlorosilane, dichlorosilane, and tetrachlorosilane.

The chlorosilane solution which is used in the hydrogen chloride removal step 3 can contain part of the chlorosilane condensate 26 which is obtained in the separation step 2. In order to efficiently remove hydrogen chloride, the chlorosilane solution which is used in the hydrogen chloride removal step 3 preferably contains no hydrogen chloride. Thus, the chlorosilane solution which is used in the hydrogen chloride removal step 3 is preferably a chlorosilane solution 21a which is obtained through the hydrogen chloride diffusion step 4 (described later) and in which hydrogen chloride has been diffused. Such a preferable arrangement allows the chlorosilane condensate 26 and/or the chlorosilane solution 21a to be effectively used.

In the hydrogen chloride removal step 3, hydrogen chloride which is contained in the gas component A 14 is removed by bringing the hydrogen chloride which is contained in the gas component A 14 into contact with a chlorosilane solution so as to cause the chlorosilane solution to absorb the hydrogen chloride.

In the hydrogen chloride removal step 3, a chlorosilane solution which has been cooled is preferably used so that the hydrogen chloride is efficiently removed from the gas component A 14. The chlorosilane solution preferably has a temperature of preferably not higher than −40° C., and more preferably not higher than −50° C. so that the hydrogen chloride is efficiently removed from the gas component A 14.

In the hydrogen chloride removal step 3, in order that the hydrogen chloride is efficiently removed from the gas component A 14, an amount of the chlorosilane compound which is contained in the chlorosilane solution which is to be brought into contact with the gas component A 14 can be suitably set based on a total amount of silane which is contained in the chlorosilane compound. The total amount of the silane which is contained in the chlorosilane compound is preferably not less than 130 mol, and more preferably not less than 140 mol, with respect to 1 mol of the hydrogen chloride which is contained in the gas component A 14. In order to reduce running costs, the total amount of the silane which is contained in the chlorosilane compound is preferably not more than 150 mol with respect to 1 mol of the hydrogen chloride which is contained in the gas component A 14.

A method of bringing the chlorosilane solution into contact with the gas component A 14 in the hydrogen chloride removal step 3 is exemplified by, but not particularly limited to, publicly known methods such as a bubbling method, a packed tower method, and a shower method. Note that the hydrogen chloride removal step 3 can be carried out in publicly known equipment such as a gas-liquid contact column.

A gas component which is obtained by bringing the chlorosilane solution into contact with the gas component A 14 is designated as the gas component B 15. The gas component B 15 which is obtained in the hydrogen chloride removal step 3 contains hydrogen gas as a main component. The gas component B 15 further (i) contains the chlorosilane compound in an amount of approximately several percent by volume and (ii) contains the hydrogen chloride which remains to be removed. The hydrogen chloride is contained in the gas component B 15 at a concentration of not more than 1 ppm, and more preferably not more than 0.1 ppm.

In the hydrogen chloride removal step 3, a chlorosilane solution 20 which has been brought into contact with the gas component A 14 so as to absorb the hydrogen chloride is preferably supplied to the hydrogen chloride diffusion step 4 (described later). Such an arrangement makes it possible to effectively use the chlorosilane solution 20 by which the hydrogen chloride has been absorbed.

<4. Hydrogen Refining Step 5>

The method for producing polycrystalline silicon includes a hydrogen refining step 5 of obtaining the hydrogen gas A 22a and hydrogen gas A 22b by removing the chlorosilane compound by bringing the gas component B 15 into contact with activated carbon.

The hydrogen refining step 5 is preferably carried out by supplying the gas component B 15 to an adsorption tower which is filled with an activated carbon layer or activated carbon. In a case where the gas component B 15 is brought into contact with the activated carbon in the adsorption tower, the chlorosilane compound which is contained in the gas component B 15 is adsorbed and removed by the activated carbon. This makes it possible to obtain the hydrogen gas A 22a and the hydrogen gas A 22b. The adsorption tower which is used in the hydrogen refining step 5 may be referred to as a chlorosilane adsorption tower because the adsorption tower mainly adsorbs the chlorosilane compound.

The activated carbon which is used in the hydrogen refining step 5 is not limited to any particular activated carbon provided that the activated carbon allows the chlorosilane compound to be removed from the gas component B 15. As the activated carbon which is used in the hydrogen refining step 5, it is possible to use publicly known activated carbon.

The activated carbon which is used in the hydrogen refining step 5 has a shape which is not limited to any particular shape. Note, however, that the activated carbon which is used in the hydrogen refining step 5 is preferably, for example, granular activated carbon, honeycomb activated carbon, or fibrous activated carbon. Of these activated carbons, the granular activated carbon is preferable. This is because the granular activated carbon allows the adsorption tower to be filled with the activated carbon in a larger amount per unit volume. The granular activated carbon preferably has a particle size of 1 mm to 6 mm.

Activated carbon commonly easily adsorbs moisture which is contained in the air. In a case where activated carbon which has adsorbed moisture is subjected to the hydrogen refining step 5, the moisture may react with the chlorosilane compound which is contained in the gas component B 15, so that a silicon oxide may be produced on the activated carbon. Production of the silicon oxide on the activated carbon causes an inconvenience(s) such as blocking of a pipe and/or contamination, and thus is not preferable. Thus, the activated carbon which is used in the hydrogen refining step 5 is preferably subjected to the hydrogen refining step 5 after moisture which has been adsorbed by the activated carbon is removed. The moisture can be removed by at least one of a pressure reduction treatment and a heating treatment.

In order to completely remove the moisture which is contained in the activated carbon, it is possible to carry out the pressure reduction treatment, at a pressure of preferably not more than $1\times10^4$ Pa, and more preferably not more than $1\times10^3$ Pa in terms of an absolute pressure, by maintaining a reduced pressure state for a certain period of time.

In order to completely remove the moisture which is contained in the activated carbon, it is possible to carry out the heating treatment, at a temperature of preferably 80° C. to 130° C., by maintaining a heated state for a certain period of time. In order to completely remove the moisture which is contained in the activated carbon, it is preferable to carry out the heating treatment under flow of inert gas or under reduced pressure. Examples of the inert gas which is used in the heating treatment include nitrogen, helium, and argon. A preferable reduced pressure at which to carry out the heating treatment under reduced pressure is identical to the reduced pressure at which to carry out the pressure reduction treatment.

Each of the pressure reduction treatment and the heating treatment is preferably carried out until the moisture which is contained in the activated carbon is completely removed. It can be confirmed, by measuring a dew point of an atmosphere, whether the moisture has been completely removed. In order to completely remove the moisture which is contained in the activated carbon, it is preferable to remove the moisture until the dew point of the atmosphere reaches preferably not higher than −30° C., and more preferably not higher than −40° C.

In the hydrogen refining step 5, an adsorption temperature and an adsorption pressure at each of which to adsorb and remove the chlorosilane compound by bringing the gas component B 15 into contact with the activated carbon are not limited to any particular adsorption temperature and any particular adsorption pressure, respectively, provided that the adsorption temperature and the adsorption pressure each allow the chlorosilane compound to be completely adsorbed and removed. The adsorption temperature is preferably −30° C. to 50° C., and more preferably −10° C. to 40° C. The adsorption pressure is preferably not less than 1300 kPaG, and more preferably not less than 1500 kPaG. The adsorption temperature which falls within the above range and the adsorption pressure which falls within the above range each allow the chlorosilane compound to be completely adsorbed and removed from the gas component B 15.

In the hydrogen refining step 5, a velocity at which to pass the gas component B 15 through the adsorption tower which is filled with the activated carbon layer or the activated carbon (i.e., a passage velocity) is not limited to any particular velocity, provided that the velocity allows the chlorosilane compound which is contained in the gas component B 15 to be completely removed. The passage velocity can be appropriately determined in consideration of a capability of the adsorption tower. In the hydrogen refining step 5, the passage velocity at which the gas component B 15 is passed through the adsorption tower is preferably 50 $Hr^{-1}$ to 500 $Hr^{-1}$, and more preferably 50 $Hr^{-1}$ to 150 $Hr^{-1}$ in terms of a spatial velocity (SV).

The gas component B 15 may contain a small amount of hydrogen chloride. Note, however, that the small amount of hydrogen chloride, together with the chlorosilane compound, is adsorbed by the activated carbon in the hydrogen refining step 5.

Each of the hydrogen gas A 22a and the hydrogen gas A 22b which are obtained in the hydrogen refining step 5 is preferably hydrogen gas which has a purity of not less than 99.99 vol %. An amount of the chlorosilane compound which is contained in each of the hydrogen gas A 22a and the hydrogen gas A 22b which are obtained in the hydrogen refining step 5 can be suitably controlled based on the total amount of the silane which is contained in the chlorosilane compound. The total amount of the silane which is contained in the chlorosilane compound is preferably not more than 3 ppm, more preferably not more than 1 ppm, and still more preferably not more than 0.1 ppm. The above arrangement allows each of the hydrogen gas A 22a and the hydrogen gas A 22b which are obtained in the hydrogen refining step 5 to be high purity hydrogen gas.

The hydrogen gas A 22a which is obtained in the hydrogen refining step 5 is high purity hydrogen gas and thus can be cyclically used, as it is, as material gas for use in the silicon deposition step 1. The hydrogen gas A 22b can be used as hydrogen gas B 28 which is used in an activated carbon regeneration step 6 (described later). Furthermore, the hydrogen gas A 22a can be used as hydrogen which is used in a reaction of reduction from tetrachlorosilane to trichlorosilane, or can be used as a hydrogen source in production of silica which is made of tetrachlorosilane (not illustrated in FIG. 1).

The present production method preferably includes supplying, to the silicon deposition step 1, the hydrogen gas A 22a which is obtained through the hydrogen refining step 5. The above arrangement, in which hydrogen gas is reused, makes it possible to provide a method for producing polycrystalline silicon at a lighter environmental load and at low production cost.

In order to supply, to another step such as the silicon deposition step 1, the hydrogen gas A 22a which is obtained through the hydrogen refining step 5, it is possible to apply pressure to the hydrogen gas A 22*a* before the hydrogen gas A 22*a* is supplied to the another step. It is possible to apply pressure to the hydrogen gas A 22*a* by a method similar to a method by which to apply pressure to a gas component C (to which no pressure has been applied) 18 in a circulation step 7 (described later).

<5. Activated Carbon Regeneration Step 6>

The present production method includes the activated carbon regeneration step 6 of bringing activated carbon 16, which has been brought into contact with the gas component B 15, into contact with the hydrogen gas B 28 so as to regenerate the activated carbon 16.

In the hydrogen refining step 5, the chlorosilane compound which has been removed from the gas component B 15 is adsorbed and held by the adsorption tower which is filled with the activated carbon layer or the activated carbon. In the activated carbon regeneration step 6, the chlorosilane compound is desorbed from the activated carbon 16 which was used in the hydrogen refining step 5 and has been brought into contact with the gas component B 15, so that the activated carbon 16 which has been brought into contact with the gas component B 15 is regenerated. Thus, regenerated activated carbon 17 can be obtained. The regenerated activated carbon 17 can be reused in the hydrogen refining step 5. The activated carbon regeneration step 6 can be carried out by causing the hydrogen gas B 28, which is purge gas, to flow to the activated carbon by which the chlorosilane compound is adsorbed and held. This causes purge exhaust gas which is discharged from the activated carbon 16 which has been brought into contact with the gas component B 15, i.e., the gas component C (to which no pressure has been applied) 18 to contain the chlorosilane compound and hydrogen.

In a case where the gas component B 15 which is subjected to the hydrogen refining step 5 contains a small amount of hydrogen chloride, the small amount of hydrogen chloride, together with the chlorosilane compound, is adsorbed by the activated carbon in the hydrogen refining step 5. Specifically, the activated carbon 16 which has been brought into contact with the gas component B 15 contains the small amount of hydrogen chloride. This may cause the gas component C (to which no pressure has been applied) 18 which is obtained in the activated carbon regeneration step 6 to contain hydrogen chloride.

A condition under which to desorb the chlorosilane compound in the activated carbon regeneration step 6 is not limited to any particular condition, provided that the condition allows the chlorosilane compound to be desorbed from the activated carbon. The condition can be appropriately determined in consideration of, for example, a capability of the adsorption tower. The chlorosilane compound is ordinarily desorbed from the activated carbon at a temperature of 10° C. to 300° C. and under a pressure of not more than 200 kPaG while hydrogen is caused to flow to the activated carbon. In order for the chlorosilane compound to be desorbed with higher efficiency, it is particularly preferable to cause the hydrogen to flow to the activated carbon at a temperature of 150° C. to 250° C. and under a pressure of not more than 100 kPaG. A velocity (spatial velocity (SV)) at which to cause the hydrogen gas B 28, which is purge gas, to flow to the activated carbon is not limited to any particular velocity, provided that the velocity allows the chlorosilane compound which has been adsorbed and held by the activated carbon to be completely desorbed. The velocity can be appropriately determined in consideration of, for example, a capability of the adsorption tower. The spatial velocity (SV) is generally 1 $Hr^{-1}$ to 50 $Hr^{-1}$, and is preferably appropriately determined in a range of 1 $Hr^{-1}$ to 20 $Hr^{-1}$.

In the activated carbon regeneration step 6, a purity of the hydrogen gas B 28, which is purge gas, is not limited to any particular purity. It is possible to use, as it is, hydrogen which is industrially available. Note, however, that, in a case where the hydrogen gas B 28, which is purge gas, contains an impurity, the impurity may be adsorbed by the activated carbon while the chlorosilane compound is being desorbed in the activated carbon regeneration step 6. In a case where the regenerated activated carbon 17 which has adsorbed such an impurity is reused to remove the chlorosilane compound from the gas component B 15 in the hydrogen refining step 5, the hydrogen gas A 22*a* and the hydrogen gas A 22*b* which have been discharged from the activated carbon may be contaminated with the impurity. The present production method is preferably arranged such that, even in a case where the gas component B 15 is brought into contact with the regenerated activated carbon 17 in the hydrogen refining step 5, neither of the hydrogen gas A 22*a* and the hydrogen gas A 22*b* which are obtained from the regenerated activated carbon 17 is contaminated with the regenerated activated carbon 17. The hydrogen gas B 28 is thus preferably high purity hydrogen. As such hydrogen, it is possible to suitably use, for example, the hydrogen which is used in the silicon deposition step 1, or the hydrogen gas A 22*b* which has been obtained in the hydrogen refining step 5.

The hydrogen refining step 5 and the activated carbon regeneration step 6 can be industrially continuously carried out. In order to thus continuously carry out the hydrogen refining step 5 and the activated carbon regeneration step 6, it is necessary to (i) provide a plurality of adsorption towers each of which is filled with activated carbon and (ii) alternately carry out (a) the hydrogen refining step 5 of causing a chlorosilane compound to be adsorbed by activated carbon which is contained in an adsorption tower and (b) the activated carbon regeneration step 6 of regenerating that activated carbon. For example, it is possible to provide two adsorption towers so as to (i) carry out the hydrogen refining step 5 in one of the two adsorption towers and (ii) carry out the activated carbon regeneration step 6 in the other of the two adsorption towers while carrying out the hydrogen refining step 5 in the one of the two adsorption towers. Alternatively, it is possible to provide three or more adsorption towers so as to (i) use one of the three or more adsorption towers to carry out the hydrogen refining step 5 and (ii) use two or more of the three or more adsorption towers to carry out the activated carbon regeneration step 6. Alternatively, it is possible to provide four or more adsorption towers. In equipment that is highly capable of producing polycrystalline silicon, as the adsorption towers for use in the hydrogen refining step 5 and in the activated carbon regeneration step 6, it is possible to use adsorption towers whose capacity per adsorption tower is great, or to use a plurality of adsorption towers in parallel.

The following description discusses the case of providing a plurality of adsorption towers so as to continuously carry out the hydrogen refining step 5 and the activated carbon regeneration step 6 by switching between the hydrogen refining step 5 and the activated carbon regeneration step 6 so that the hydrogen refining step 5 and the activated carbon regeneration step 6 are alternately carried out. In this case, a timing at which to switch between the hydrogen refining step 5 and the activated carbon regeneration step 6 each of which is carried out in a corresponding one(s) of the adsorption towers is not limited to any particular timing. For example, it is possible to (i) set, in advance, a time for which to carry out the hydrogen refining step 5 and a time for which to carry out the activated carbon regeneration step 6, and (ii) after a certain time has passed, switch the hydrogen refining step 5 to the activated carbon regeneration step 6, or switch the activated carbon regeneration step 6 to the hydrogen refining step 5. Each of the time for which to carry out the hydrogen refining step 5 and the time for which to carry out the activated carbon regeneration step 6 is appropriately determined in consideration of, for example, a capacity of an adsorption tower and an amount of the gas component B 15 which is supplied to an adsorption tower.

The present production method is preferably arranged such that the gas component C (to which no pressure has been applied) 18 satisfies the following Inequality.

Inequality: dichlorosilane content<trichlorosilane content+tetrachlorosilane content where the dichlorosilane content represents a ratio (mol %) of dichlorosilane to a total of the dichlorosilane content, the trichlorosilane content, and the tetrachlorosilane content in the gas component C (to which no pressure has been applied) 18; the trichlorosilane content represents a ratio (mol %) of trichlorosilane to the total of the dichlorosilane content, the trichlorosilane content, and the tetrachlorosilane content in the gas component C (to which no pressure has been applied) 18; and the tetrachlorosilane content represents a ratio (mol %) of tetrachlorosilane to the total of the dichlorosilane content, the trichlorosilane content, and the tetrachlorosilane content in the gas component C (to which no pressure has been applied) 18.

<6. Circulation Step 7>

The present production method includes the circulation step 7 of applying pressure to the gas component C (to which no pressure has been applied) 18 which is obtained through the activated carbon regeneration step 6, and supplying the gas component C (to which no pressure has been applied) 18 to the separation step 2.

The gas component C (to which no pressure has been applied) 18 which is obtained through the activated carbon regeneration step 6 contains the hydrogen and the chlorosilane compound, and, in some cases, further contains hydrogen chloride. In order to supply the gas component C (to which no pressure has been applied) 18 to the separation step 2, it is necessary to obtain a gas component C (to which pressure has been applied) 19 by a method of applying pressure to the gas component C (to which no pressure has been applied) 18. Thus, the circulation step 7 is also a step of applying pressure to the gas component C (to which no pressure has been applied) 18 so as to obtain the gas component C (to which pressure has been applied) 19.

In the circulation step 7, the method of applying pressure to the gas component C (to which no pressure has been applied) 18 is not limited to any particular method, and a publicly known pressure application method can be employed as the method. Specific examples of the publicly known pressure application method include pressure application methods carried out with use of turbo compressors such as a centrifugal compressor and an axial flow compressor; and pressure application methods carried out with use of volume compressors such as a reciprocating compressor, a diaphragm compressor, a screw compressor, and a rotary compressor.

In the circulation step 7, a pressure at which to carry out pressure application with respect to the gas component C (to which no pressure has been applied) 18 is not limited to any particular pressure, provided that the pressure is high enough for the gas component C to be supplied to the separation step 2. Thus, it is ordinarily only necessary to apply pressure to the gas component C (to which no pressure has been applied) 18 until the gas component C (to which pressure has been applied) 19 has a pressure which falls within the range of 500 kPaG to 600 kPaG. Pressure is applied to the gas component C (to which no pressure has been applied) 18 by such a compression method as listed above, so that the gas component C (to which pressure has been applied) 19 is obtained and can be supplied to the separation step 2.

In the circulation step 7, a pressure at which to carry out pressure application with respect to the gas component C (to which no pressure has been applied) 18 is not limited to any particular pressure, provided that the pressure is high enough for the gas component C to be supplied to the separation step 2. The pressure is preferably 500 kPaG to 1000 kPaG, and more preferably 500 kPaG to 700 kPaG. Specifically, the gas component C (to which pressure has been applied) 19 preferably has a pressure which falls within the above range. The gas component C (to which no pressure has been applied) 18 which is subjected to pressure application at a pressure which falls within the above range brings (i) an advantage of allowing the gas component C (to which pressure has been applied) 19 to be efficiently supplied to the separation step 2 and (ii) an advantage of allowing pressure application equipment to be constructed on a small scale and at lower cost.

<7. Hydrogen Chloride Diffusion Step 4>

The method for producing polycrystalline silicon preferably includes the hydrogen chloride diffusion step of diffusing the hydrogen chloride from the chlorosilane solution 20 by which the hydrogen chloride has been absorbed in the hydrogen chloride removal step 3. The above arrangement allows the chlorosilane solution 20 to be separated into the hydrogen chloride and a chlorosilane solution part, so that the chlorosilane solution 21*a* and a chlorosilane solution 21*b* in each of which the hydrogen chloride has been diffused can be reused for the hydrogen chloride removal step 3 or supplied to a distillation system.

In the hydrogen chloride diffusion step 4, the chlorosilane solution 20 by which the hydrogen chloride has been absorbed in the hydrogen chloride removal step 3 is supplied to a diffusion tower, so that the hydrogen chloride which is gaseous can be collected, in a form of hydrogen chloride 27 which has been diffused, from the top of the diffusion tower.

In the hydrogen chloride diffusion step 4, a diffusion tower of a publicly known type can be employed as the diffusion tower without any particular limitation. The hydrogen chloride diffusion step 4 can be carried out with use of, for example, the diffusion tower which is of a packed tower type, a tray tower type, or the like having a reboiler at its bottom.

In the hydrogen chloride diffusion step 4, it is possible to apply, without any particular limitation, a publicly known condition to a condition under which to diffuse the hydrogen chloride. Note, however, that the hydrogen chloride is preferably diffused at a temperature of 110° C. to 150° C. and at a pressure of 700 kPaG to 900 kPaG.

The present production method preferably includes supplying, to the hydrogen chloride diffusion step 4, the chlorosilane condensate 26 which is obtained through the separation step 2. The above arrangement allows the hydrogen chloride which is contained in the chlorosilane condensate 26 which has been obtained through the separation step 2 to be collected in the hydrogen chloride diffusion step 4 in a form of the hydrogen chloride 27 which has been diffused. Furthermore, supply of the chlorosilane condensate 26 to the hydrogen chloride diffusion step 4 results in a reduction in concentration of the hydrogen chloride in the chlorosilane condensate 26. This makes it possible to obtain a chlorosilane compound which can be more suitably used for the distillation step 11 (described later).

The hydrogen chloride 27 which has been diffused and obtained in the hydrogen chloride diffusion step 4 contains hydrogen chloride as a main component, and may contain, in addition to the hydrogen chloride, a small amount of hydrogen and a small amount of the chlorosilane compound.

The hydrogen chloride 27 which has been diffused and obtained in the hydrogen chloride diffusion step 4 is preferably used in another step. This makes it possible to effectively use the hydrogen chloride 27 which has been diffused.

The hydrogen chloride diffusion step 4 is preferably arranged such that the chlorosilane solution 21b in which the hydrogen chloride has been diffused is supplied to the distillation step 11 and the chlorosilane compound 29 which is obtained after the chlorosilane solution 21b has been distilled is made gaseous and then reused as material gas for use in the silicon deposition step 1. This makes it possible to effectively use the chlorosilane compound 29 which is obtained after the chlorosilane solution 21b has been distilled.

<8. Absorbing Solution Circulation Step>

The present production method preferably further includes an absorbing solution circulation step of supplying, to the hydrogen chloride removal step 3, part of the chlorosilane solution 21a which is obtained through the hydrogen chloride diffusion step 4 and in which the hydrogen chloride has been diffused. The above arrangement, in which the chlorosilane solution is reused, makes it possible to provide a method for producing polycrystalline silicon at a lighter environmental load and at low production cost.

The hydrogen chloride diffusion step 4 is preferably arranged to be provided with a chlorosilane solution line through which to circulate, to the hydrogen chloride removal step 3, a chlorosilane solution at the bottom of the diffusion tower, i.e., part of the chlorosilane solution 21a in which the hydrogen chloride has been diffused. In a case where the chlorosilane solution line is provided, the chlorosilane solution 21a in which the hydrogen chloride has been diffused can be used as part or all of the chlorosilane solution which is used in the hydrogen chloride removal step 3. This makes it possible to effectively use the chlorosilane solution 21a in which the hydrogen chloride has been diffused.

<9. Distillation Step 11>

The present production method preferably includes the distillation step 11 of distilling the chlorosilane solution 21b in which the hydrogen chloride has been diffused, and supplying, to the silicon deposition step 1, the chlorosilane compound 29 which is obtained after the chlorosilane solution 21b has been distilled. This allows the chlorosilane compound 29 which is obtained after the chlorosilane solution 21b has been distilled to be reused as material gas for use in the silicon deposition step 1. Note that, if necessary, it is possible to provide a refining step which is carried out before the chlorosilane compound 29 which is obtained after the chlorosilane solution 21b has been distilled is supplied to the silicon deposition step 1.

An embodiment of the present invention can be arranged as below.

[1] A method in accordance with an embodiment of the present invention for producing polycrystalline silicon including: a silicon deposition step of depositing the polycrystalline silicon by reacting a chlorosilane compound and hydrogen together; a separation step of separating, into a chlorosilane condensate and a gas component A, exhaust gas which is discharged through the silicon deposition step; a hydrogen chloride removal step of obtaining a gas component B by removing hydrogen chloride by bringing the gas component A into contact with a chlorosilane solution; a hydrogen refining step of obtaining hydrogen gas A by removing the chlorosilane compound by bringing the gas component B into contact with activated carbon; an activated carbon regeneration step of bringing the activated carbon, which has been brought into contact with the gas component B, into contact with hydrogen gas B so as to regenerate the activated carbon; and a circulation step of applying pressure to a gas component C which is obtained through the activated carbon regeneration step, and supplying the gas component C to the separation step.

[2] The method recited in [1], further including a hydrogen chloride diffusion step of diffusing the hydrogen chloride from the chlorosilane solution by which the hydrogen chloride has been absorbed in the hydrogen chloride removal step.

[3] The method recited in [2], further including an absorbing solution circulation step of supplying, to the hydrogen chloride removal step, part of the chlorosilane solution which is obtained through the hydrogen chloride diffusion step and in which the hydrogen chloride has been diffused.

[4] The method recited in [2] or [3], further including supplying, to the hydrogen chloride diffusion step, the chlorosilane condensate which is obtained through the separation step.

[5] The method recited in any one of [1] through [4], further including supplying, to the silicon deposition step, the hydrogen gas A which is obtained through the hydrogen refining step.

[6] The method recited in any one of [1] through [5], wherein the gas component C satisfies the following Inequality:

Inequality: dichlorosilane content<trichlorosilane content+tetrachlorosilane content where the dichlorosilane content represents a ratio (mol %) of dichlorosilane to a total of the dichlorosilane content, the trichlorosilane content, and the tetrachlorosilane content; the trichlorosilane content represents a ratio (mol %) of trichlorosilane to the total of the dichlorosilane content, the trichlorosilane content, and the tetrachlorosilane content; and the tetrachlorosilane content represents a ratio (mol %) of tetrachlorosilane to the total of the dichlorosilane content, the trichlorosilane content, and the tetrachlorosilane content.

[7] The method recited in any one of [1] through [6], wherein the separation step includes cooling the exhaust gas to a temperature of not higher than −10° C.

EXAMPLES

Example 1

An embodiment of the present invention was carried out by the method illustrated in FIG. 1.

In the silicon deposition step 1, polycrystalline silicon was deposited by the Siemens method. In a bell jar (reactor) having an inner capacity of 10 m$^3$, 50 sets of inverted U polycrystalline silicon core wires were provided to an electrode which was provided on a base plate of the bell jar. The temperature in the bell jar was adjusted, by an amount of an electric current which was passed through each of the polycrystalline silicon core wires, so that the temperature of the polycrystalline silicon core wires would be maintained at approximately 1000° C. Under the above condition, the hydrogen gas A 22a, which was material gas, and the chlorosilane compound 29 which had been made gaseous were supplied to the inside of the bell jar so that the polycrystalline silicon was deposited. Note here that a molar ratio of the hydrogen gas A 22a to the chlorosilane compound 29 was 7. Note also that most of the chlorosilane compound 29 was trichlorosilane.

In the silicon deposition step 1, the exhaust gas 13 whose composition is shown in Table 1 below was obtained from the bell jar in an amount of 24000 Nm³/hour.

TABLE 1

| | Component | | | | | | |
|---|---|---|---|---|---|---|---|
| | TCS | STC | DCS | Hydrogen | Hydrogen chloride | B | P |
| Composition | 13 mol % | 6 mol % | 2 mol % | 78 mol % | 1 mol % | 0.2 ppba | 10 ppba |

The exhaust gas 13 was sent to the separation step 2 and cooled to −15° C. with use of a cooler, so that the gas component A 14 whose composition is shown in Table 2 and the chlorosilane condensate 26 whose composition is shown in Table 2 were obtained.

TABLE 2

| | | Component | | | | |
|---|---|---|---|---|---|---|
| | | TCS | STC | DCS | Hydrogen | Hydrogen chloride |
| Gas component A 14 | Composition | 1.5 mol % | 0.3 mol % | 0.4 mol % | 97 mol % | 0.8 mol % |
| Chlorosilane condensate 26 | Composition | 60 mol % | 30 mol % | 9 mol % | 0 mol % | 1 mol % |

The gas component A 14 was sent to the hydrogen chloride removal step 3 in an amount of 20000 Nm³/hour. Then, in the hydrogen chloride removal step 3, a gas-liquid contact column was used to bring the gas component A 14 into contact with a chlorosilane solution in an amount of 120 m³/hour, so that the gas component B 15 which is shown in Table 3 was obtained.

TABLE 3

| | Component | | | | | | |
|---|---|---|---|---|---|---|---|
| | TCS | STC | DCS | Hydrogen | Hydrogen chloride | B | P |
| Composition | 0.2 mol % | 0 mol % | 0.1 mol % | 99.7 mol % | 0 mol % | 0.1 ppba | 0.1 ppba |

Note that the chlorosilane solution 21a (i) which was obtained through the hydrogen chloride diffusion step 4 to which the chlorosilane condensate 26 had been supplied and (ii) in which the hydrogen chloride had been diffused was used as the chlorosilane solution.

Meanwhile, the chlorosilane solution which had been used in the hydrogen chloride removal step 3 was sent, to the hydrogen chloride diffusion step 4, in a form of the chlorosilane solution 20 by which the hydrogen chloride had been absorbed.

Subsequently, the gas component B 15 was treated with use of the adsorption tower which was provided in the hydrogen refining step 5 (hereinafter referred to as a "chlorosilane adsorption tower" in Examples). Then, the hydrogen gas A 22a which had been obtained in the hydrogen refining step 5 was supplied to the silicon deposition step 1 as described earlier. Note here that, in a case where hydrogen gas was insufficient to carry out the silicon deposition step 1, hydrogen gas which had been produced and refined with use of electrolytic equipment was added to the silicon deposition step 1.

Three chlorosilane adsorption towers which were juxtaposed to each other and each of which was filled with activated carbon (Chlorsorb (product name) manufactured by Jacobi Carbons) were used to alternately adsorb and desorb the chlorosilane compound. Specifically, a chlorosilane adsorption tower (containing the activated carbon 16 which had been brought into contact with the gas component B) which had finished adsorbing the chlorosilane compound was subjected to the activated carbon regeneration step 6, in which the activated carbon which was contained in the chlorosilane adsorption tower was regenerated, so that the regenerated chlorosilane adsorption tower (containing the regenerated activated carbon 17) was obtained. The activated carbon regeneration step 6 was carried out by supplying, in a form of the hydrogen gas A 22b, part of the hydrogen gas A which was obtained through the hydrogen refining step 5, and purging the adsorbed chlorosilane compound while adjusting the temperature in the chlorosilane adsorption tower to not lower than 120° C. Note here that, as the hydrogen gas, only the hydrogen gas A 22b was used, and the hydrogen gas B was not used. Purge exhaust gas containing the chlorosilane compound was obtained in a form of the gas component C (to which no pressure has been applied) 18. The gas component C (to which no pressure has been applied) 18 was sent to the circulation step 7, subjected to pressure increase carried out with use of a compressor, and then supplied, in a form of the gas component C (to which pressure has been applied) 19, to the separation step 2.

Table 4 shows the composition of the gas component C (to which no pressure has been applied) 18.

TABLE 4

| | Component | | | | | | |
|---|---|---|---|---|---|---|---|
| | TCS | STC | DCS | Hydrogen | Hydrogen chloride | B | P |
| Composition | 2 mol % | 0.1 mol % | 1.4 mol % | 96 mol % | 0.5 mol % | Undetected | Undetected |

As is clear from Table 4 above, no boron (B) and no phosphorus (P) were detected in the gas component C (to which no pressure has been applied) 18, which was purge exhaust gas. Thus, even in a case where the gas component C (to which no pressure has been applied) 18 obtained is reused, as a source of the chlorosilane compound, in the separation step 2, boron and phosphorus hardly accumulate in a circulating system of the chlorosilane compound.

Meanwhile, the chlorosilane solution from which the hydrogen chloride had been removed in the hydrogen chloride diffusion step 4 was sent, in a form of the chlorosilane solution 21b, to the distillation step 11. In the distillation step 11, refined trichlorosilane was obtained as a distillate of a distillation column, and the trichlorosilane was supplied, in a form of the chlorosilane compound 29, to the silicon deposition step 1 after being made gaseous. Note here that, in a case where the chlorosilane compound was insufficient to carry out the silicon deposition step 1, a chlorosilane compound was added to the silicon deposition step 1 as below. Specifically, a chlorosilane compound which had been separately produced by reacting metal silicon and tetrachlorosilane together was supplied to the distillation step 11, and the chlorosilane compound 29 which was obtained after the chlorosilane compound thus separately produced had been distilled was made gaseous and then added to the silicon deposition step 1.

Note that the hydrogen chloride 27 which had been diffused was also obtained in the hydrogen chloride diffusion step 4.

The compositions shown in the above Tables are measurement data obtained on the 10th day of the start of operation under the conditions described in Example 1.

Comparative Example 1

Comparative Example 1 carried out operation as in the case of Example 1 except that Comparative Example arranged Example 1 such that in the hydrogen chloride removal step 3, hydrogen chloride was removed by using a hydrogen chloride adsorption tower instead of the gas-liquid contact column.

As the hydrogen chloride adsorption tower, an adsorption tower which was filled with activated carbon (Chlorsorb (product name) manufactured by Jacobi Carbons) was used. Two hydrogen chloride adsorption towers which were juxtaposed to each other were used to alternately adsorb and desorb the hydrogen chloride. Specifically, a hydrogen chloride adsorption tower which had finished adsorbing the hydrogen chloride was subjected to an activated carbon regeneration step. In the activated carbon regeneration step, the activated carbon was regenerated by supplying part of hydrogen gas which was obtained through a hydrogen refining step, and purging the adsorbed hydrogen chloride while adjusting the temperature in the adsorption tower to not lower than 120° C.

As in the case of Example 1, Comparative Example 1 treated, with use of a chlorosilane adsorption tower which was provided in the hydrogen refining step, a gas component from which the hydrogen chloride had been removed with use of the hydrogen chloride adsorption tower. In other words, in Comparative Example 1, the adsorption towers each of which was filled with the activated carbon include (i) the hydrogen chloride adsorption tower which was configured to remove the hydrogen chloride and (ii) the chlorosilane adsorption tower which was configured to adsorb a chlorosilane compound.

In Comparative Example 1, purge exhaust gas (corresponding to the gas component C (to which no pressure has been applied) 18 of Example 1) which was obtained by purging the chlorosilane compound from the chlorosilane adsorption tower which had finished adsorbing the chlorosilane compound and which contained the chlorosilane compound had the composition which is shown in Table 5.

TABLE 5

| | Component | | | | | | |
|---|---|---|---|---|---|---|---|
| | TCS | STC | DCS | Hydrogen | Hydrogen chloride | B | P |
| Composition | 8 mol % | 3 mol % | 1 mol % | 88 mol % | 0 mol % | 0.9 ppba | 1.3 ppba |

As is clear from Table 5 above, in Comparative Example 1, in which the activated carbon was used to remove the hydrogen chloride, boron (B) and phosphorus (P) were present in the purge exhaust gas which contained the chlorosilane compound. Thus, the purge exhaust gas which is reused, as a source of the chlorosilane compound, in the separation step 2 causes a problem of accumulation of boron (B) and phosphorus (P) in a circulating system of the chlorosilane compound.

INDUSTRIAL APPLICABILITY

The present production method, which is lighter in environmental load and lower in production cost than a conventional production method, can be suitably used to produce polycrystalline silicon which is used as a material of a semiconductor or a material of a wafer for solar power generation.

REFERENCE SIGNS LIST

1 Silicon deposition step
2 Separation step
3 Hydrogen chloride removal step
4 Hydrogen chloride diffusion step
5 Hydrogen refining step
6 Activated carbon regeneration step
7 Circulation step
13 Exhaust gas
14 Gas component A
15 Gas component B
16 Activated carbon which has been brought into contact with gas component B
18 Gas component C (to which no pressure has been applied)
20 Chlorosilane solution by which hydrogen chloride has been absorbed
21a, 21b Chlorosilane solution in which hydrogen chloride has been diffused
22a, 22b Hydrogen gas A
26 Chlorosilane condensate
28 Hydrogen gas B

The invention claimed is:

1. A method for producing poly crystalline silicon, comprising:
   a silicon deposition step of depositing the polycrystalline silicon by reacting a chlorosilane compound and hydrogen together;
   a separation step of separating the exhaust gas which is discharged through the silicon deposition step, under a pressure of not less than 400 kPaG, into a chlorosilane condensate and a gas component A;
   a hydrogen chloride removal step of removing hydrogen chloride by bringing the gas component A into contact with a chlorosilane solution to obtain a gas component B;

a hydrogen refining step of obtaining hydrogen gas A by bringing the gas component B into contact with activated carbon;

an activated carbon regeneration step of bringing the activated carbon, which has been brought into contact with the gas component B, into contact with hydrogen gas B so as to regenerate the activated carbon;

a circulation step of applying pressure to a gas component C, which is obtained through the activated carbon regeneration step, until a pressure of 500 kPaG to 1000 kPaG is reached, and supplying the pressurized gas component C to the separation step;

a hydrogen chloride diffusion step of diffusing the hydrogen chloride from the chlorosilane solution by which the hydrogen chloride has been absorbed in the hydrogen chloride removal step; and supplying, to the hydrogen chloride diffusion step, the chlorosilane condensate which is obtained through the separation step.

2. The method as set forth in claim 1, further comprising an absorbing solution circulation step of supplying, to the hydrogen chloride removal step, part of the chlorosilane solution which is obtained through the hydrogen chloride diffusion step and in which the hydrogen chloride has been diffused.

3. The method as set forth in claim 1, further comprising supplying, to the silicon deposition step, the hydrogen gas A which is obtained through the hydrogen refining step.

4. The method as set forth in claim 1, wherein the gas component C satisfies the following Inequality:

Inequality: dichlorosilane content<trichlorosilane content+tetrachlorosilane content where the dichlorosilane content represents a ratio (mol %) of dichlorosilane to a total of the dichlorosilane content, the trichlorosilane content, and the tetrachlorosilane content; the trichlorosilane content represents a ratio (mol %) of trichlorosilane to the total of the dichlorosilane content, the trichlorosilane content, and the tetrachlorosilane content; and the tetrachlorosilane content represents a ratio (mol %) of tetrachlorosilane to the total of the dichlorosilane content, the trichlorosilane content, and the tetrachlorosilane content.

5. The method as set forth in claim 1, wherein the separation step includes cooling the exhaust gas to a temperature of not higher than −10° C.

\* \* \* \* \*